United States Patent [19]

Goodman et al.

[11] Patent Number: 4,598,249

[45] Date of Patent: Jul. 1, 1986

[54] METHOD USING SURFACE PHOTOVOLTAGE (SPV) MEASUREMENTS FOR REVEALING HEAVY METAL CONTAMINATION OF SEMICONDUCTOR MATERIAL

[75] Inventors: Lawrence A. Goodman, Plainsboro; Alvin M. Goodman, Princeton Township, Mercer County; Herman F. Gossenberger, North Brunswick, all of N.J.

[73] Assignee: RCA Corporation, Princeton, N.J.

[21] Appl. No.: 584,814

[22] Filed: Feb. 29, 1984

[51] Int. Cl.$^4$ ............................................. G01R 31/26
[52] U.S. Cl. ............................ 324/158 R; 324/158 D
[58] Field of Search ........... 324/158 D, 158 T, 158 R, 324/73 R; 29/574

[56] References Cited

U.S. PATENT DOCUMENTS 4,333,051  6/1982  Goodman ..................... 324/158 R
4,420,722  12/1983  Todd .............................. 324/158 R

OTHER PUBLICATIONS

W. E. Phillips, "Interpretation of Steady-State Surface Photovoltage Measurements in Epitaxial Semiconductor Layers" Sol. St. Elec. 15, (1927), p. 1097.

A. M. Goodman et al., "Silicon-Wafer Process Evaluation Using Minority-Carrier Diffusion-Length Measurement by the SPV Method" RCA Review, vol. 44, Jun. 1983, pp. 326-341.

Primary Examiner—Ernest F. Karlsen
Attorney, Agent, or Firm—Birgit E. Morris; Donald S. Cohen

[57] ABSTRACT

A method for revealing the presence of heavy metal impurities that may have been introduced during the formation of a layer, such as the deposition of an epitaxial layer on a semiconductor substrate, uses the constant-magnitude steady-state surface photovoltage (SPV) method for determining the minority-carrier diffusion length by essentially two determination steps. A large ratio of the respective diffusion lengths determined before (actually measured or based on a priori knowledge of similar material) and after the epitaxial deposition step is indicative of the presence of a heavy metal impurity in the epitaxial layer. The method is based on the fact that the contaminating metal distributes itself substantially uniformly not only through the epitaxial layer but also throughout the substrate.

18 Claims, 4 Drawing Figures

METHOD USING SURFACE PHOTOVOLTAGE (SPV) MEASUREMENTS FOR REVEALING HEAVY METAL CONTAMINATION OF SEMICONDUCTOR MATERIAL

This invention relates to a method for revealing heavy metal contamination in semiconductor materials. In particular, the invention relates to revealing such a contamination in thin film epitaxial layers on single crystal bulk wafers using the constant-magnitude surface photovoltage (SPV) method.

BACKGROUND OF THE INVENTION

Apparatus and methods for determining the minority-carrier diffusion length (L) using the surface photovoltage (SPV) method are well known. In brief, the principle of the diffusion-length (L) determination requires the illumination of a specimen surface with monochromatic radiation of energy slightly greater than the bandgap of the semiconductor. Electron-hole pairs are produced and diffuse to the illuminated surface where they are separated by the electric field of the depletion region (i.e., the surface-space-charge region) to produce a surface photovoltage. A portion of the surface photovoltage signal is coupled to an amplifier for amplification and measurement. The photon flux (photons per sq. cm. per second) is adjusted to produce the same magnitude of surface photovoltage at various wavelengths of illumination. The photon flux required to produce this constant magnitude surface photovoltage signal for each wavelength is conveniently plotted on the ordinate against the reciprocal of the absorption coefficient on the abscissa. The resultant plot is typically linear and is extrapolated to the zero photon flux intercept on the negative abscissa. The magnitude of this intercept value is the effective diffusion length (L). For a more detailed description of the theory and background for this method, see an article "A Method For The Measurement Of Short Minority Carrier Diffusion Lengths In Semiconductors", by A. M. Goodman in the *Journal of Applied Physics*, Vol. 32, No. 23, pp. 2550–2552, December 1961, and the article by A. M. Goodman entitled "Improvements In Method And Apparatus For Determining Minority Carrier Diffusion Length", International Electron Devices Meeting, December 1980, pp. 231–234. The American Society for Testing and Materials has adopted a standard using this method which is published as ASTM F 391-78. The ASTM standard, when implemented according to the block diagram of FIG. 1 of ASTM F 391-78, is provided particularly for determining the diffusion length (L) for minority carriers in silicon but the method in general may be used for other semiconductor materials.

See U.S. Pat. No. 4,333,051, incorporated herein by reference thereto, entitled "Method And Apparatus For Determining Minority Carrier Diffusion Length In Semiconductors", issued on June 1, 1982 to A. M. Goodman for a description of an apparatus using this principle in which a servo system maintains a constant predetermined value of the surface photovoltage thereby allowing the measurements to be carried out in a relatively short time. The surface photovoltage pickup electrode described in this patent tends to reduce the effects of drift caused by laterally diffusing minority carriers during a test.

As described in the above-identified U.S. Pat. No. 4,333,051, the SPV method for determining diffusion length in semiconductor materials can be used to reveal contamination, particularly by heavy metals, that may have occurred during one or more steps of the processing of semiconductor materials, typically in wafer form. A specimen wafer to serve as a monitor is placed together with the wafers to be processed in a furnace or other environments for processing. Any contamination of the wafers during the processing steps, particularly the furnace steps, will also contaminate the specimen material. The contamination manifested as a decrease in the diffusion length of that specimen is an indication of such contamination.

However, after growing epitaxial layers on semiconductor wafers, it has been difficult or impossible to determine the diffusion length of such a layer because its thickness is typically less than three times the diffusion length of the material. Unless such an epitaxial layer is strongly contaminated by heavy metal impurities, the actual diffusion length of the layer will be significantly larger than the one-third thickness of the epitaxial layer. W. E. Phillips describes in an article entitled "Interpretation Of Steady-State Surface Photovoltage Measurements In Epitaxial Semiconductor Layers", Sol. St. Elec. 15, 1097 (1972), a detailed analysis for extracting the actual diffusion length in a thin epitaxial layer from the apparent or effective value of the diffusion length. However, in the most common range of interest where the epitaxial layer thickness is less than or about the same as the apparent diffusion length, the extracted value of the diffusion length in the epitaxial layer, according to Phillips' technique, is a very sensitive function of the system parameters and is subject to large errors. The parameters are often not known to the accuracy needed to obtain usefully accurate values of the diffusion length in the epitaxial layer.

SUMMARY OF THE INVENTION

According to the method of the present invention, the presence of heavy metal impurities, introduced during a particular processing step into, for example, an epitaxial surface layer formed on the body of the semiconductor material, is revealed by determining the minority-carrier diffusion length of the semiconductor body by the SPV method prior to the step of growing an epitaxial layer on one of the major surfaces of the semiconductor body. The minority-carrier diffusion length of the body of the semiconductor material is again measured subsequent to the formation of the epitaxial layer to determine a second diffusion length. A large ratio of the first determined diffusion length to subsequently determined diffusion lengths is indicative of the presence of a heavy metal impurity that was introduced into both the body and the layer during the epitaxial layer formation or any subsequent processing step.

The first SPV measuring step may be eliminated by using a priori data of similar material.

The invention is useful in monitoring a test wafer to determine the effect on product wafers.

DETAILED DESCRIPTION OF THE PREFERRED EMBODIMENTS

Figure 1:
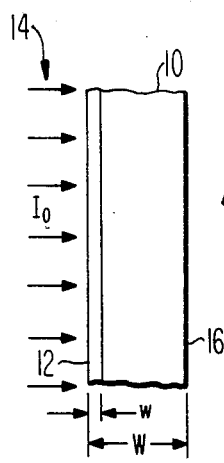
FIG. 1 is a schematic of a cross-section of a sample wafer with the geometry to be used in the description.

The wafer 10 under test (sample) is assumed to be in the form of a homogeneous semiconductor slab of thickness W, as shown in FIG. 1. One surface 12 of the sample is uniformly illuminated by chopped monochromatic light 14 of photon energy (hν) slightly larger than the bandgap ($E_G$) of the semiconductor, while the opposite surface 16 is kept in the dark. Electron-hole pairs are produced by the absorbed photons; some of these pairs diffuse toward the illuminated surface 12 where they are separated by the electric field of the surface spacecharge region whose thickness is w, thereby producing a surface photovoltage ΔV. A portion of ΔV is capacitively coupled to a transparent conducting electrode adjacent to the illuminated face; this signal is then amplified and rectified to provide a quasi-dc analog output that is proportional to ΔV as described in the above-identified U.S. Pat. No. 4,333,051. The value of ΔV is a function of the excess minority-carrier density Δp at the edge of the surface space-charge region. This density Δp(0) is in turn dependent upon the incident light flux ($I_o$), the optical absorption coefficient (α), the optical reflectance at the illuminated surface (ρ), the recombination velocity (s) at the illuminated surface, as well as the diffusion length (L). A steady-state solution of the one-dimensiona diffusion equation for the sample geometry shown in FIG. 1 is $$\Delta p(0) = \frac{I_o(1-\rho)}{D/L + s} \cdot \frac{\alpha L}{1 + \alpha L} \quad (1)$$

This simplified expression is derived under the assumptions $\alpha W > 1$, $\alpha W < 1$, $W > L$, $w < L$, and $\Delta p < < n_o$, where $n_o$ is the majority carrier density. See, for example, T. S. Moss, "Optical Properties of Semiconductors", (Butterworths, London, 1959), Chap. 4, for a description of the mathematical derivation of equation (1) above.

A series of different wavelength (λ) values is selected to give different values of α. At each wavelength, $I_o$ is adjusted to give the same value (i.e., a constant magnitude) of ΔV. It follows then that Δp(0) is a constant. If ρ is essentially constant over the wavelength region of interest, equation (1) may be written as $$I_o = C[1 + (\alpha L)^{-1}], \quad (2)$$

where C is a constant. If $I_o$ is plotted against $\alpha^{-1}$ for each constant-magnitude ΔV point, the result is a linear graph represented by line 26 whose extrapolated intercept on the negative $\alpha^{-1}$ axis is L. This is illustrated in FIG. 2.

Figure 2:
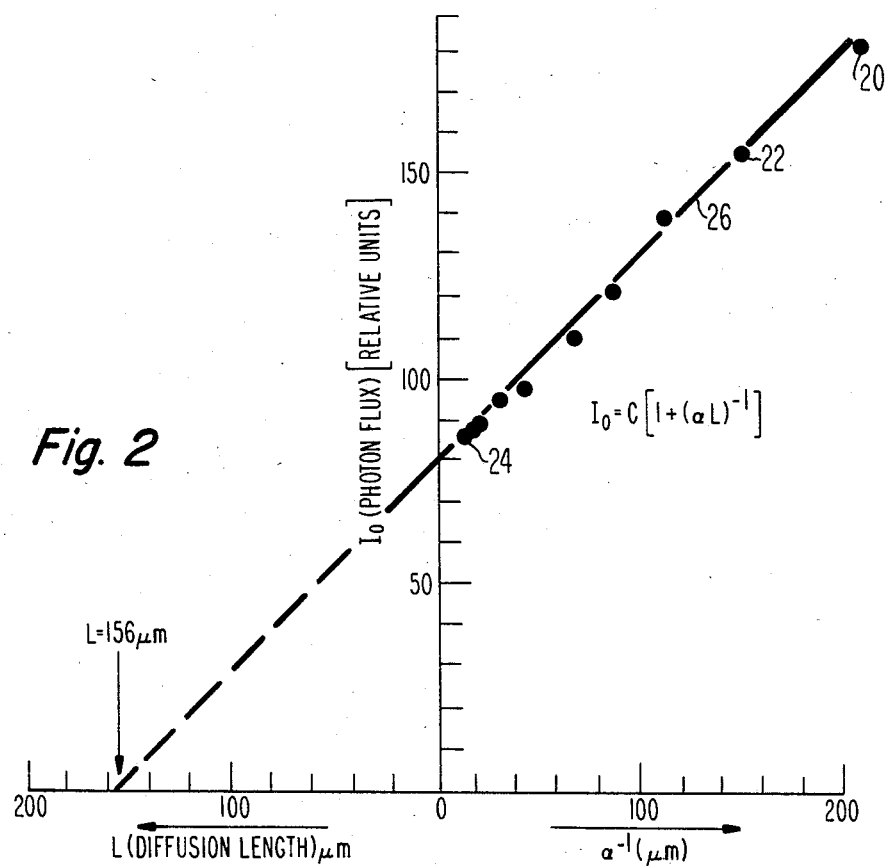
FIG. 2 is a plot of relative photon flux ($I_o$) versus the reciprocal optical absorption coefficient ($a^{-1}$)

It is seen that the data points 20, 22, ... 24 in FIG. 2, when plotted, do indeed lie on the straight line 26, and this type of measurement result is normally observed. Line 26 extended to the intercept indicates a diffusion length (L) of 156 μm.

Figure 3:
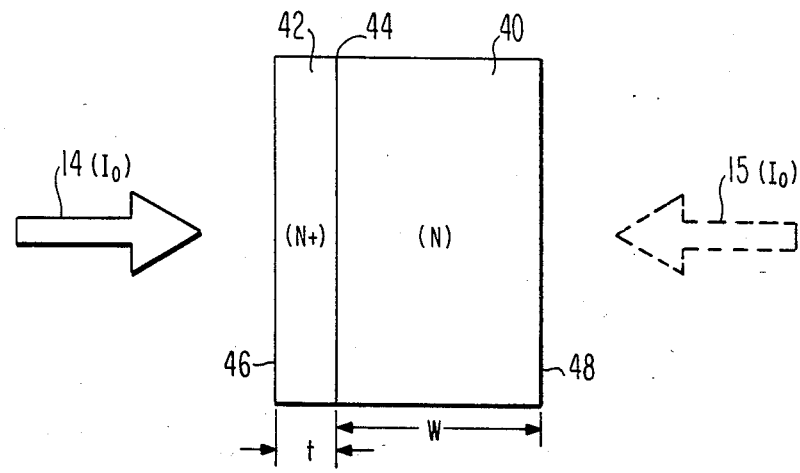
FIGS. 3 and 4 are schematics in cross-section of sample wafers with epitaxial layers used in the practice of the invention.

FIG. 3 illustrates a body or wafer 40 (similar to wafer 10 of FIG. 1) of semiconductor material, such as N-type material, provided with an epitaxial layer 42 of N+ material. The interface 44 of the body 40 and the layer 42 may have a potential barrier ($\Phi_B$) which can hinder diffusion of minority-carrier holes toward the front surface 46 on layer 42. The rear surface 48 on body 40 is kept dark during SPV measurements while the front surface 46 is illuminated by light 14. If the potential barrier $\Phi_B$ is less than where 2kT, where k is Boltzman's constant, and T is the absolute temperature in degrees Kelvin, we find that measuring the SPV from the front surface with illuminating light 14 will provide an accurate diffusion length.

However, if $\Phi_B$ is greater than 2kT, such a front face measurement may be inaccurate. In case, the SPV can be measured from the rear face. In the alternative, removing the layer 42 and measuring the SPV by illuminating the exposed surface can also be used to accurately determine the diffusion length in the body 40, as will be explained for both alternatives.

The space charge region (w) of FIG. 1 is not shown in FIG. 3 for purposes of simplicity. It should be understood, however, that a surface space region (w) does exist at the surfaces 46 and 48 of FIG. 3, and, moreover, that the respective regions are very small for purposes affecting the present invention.

The thickness W of the body 40 is typically 750 μm while the thickness t of layer 42 is typically in the range of 10–100 μm. Body 40, typically a wafer, serves as a specimen or monitor to be placed with one or more product wafers during the formation of a layer of material on the body surface.

Figure 4:
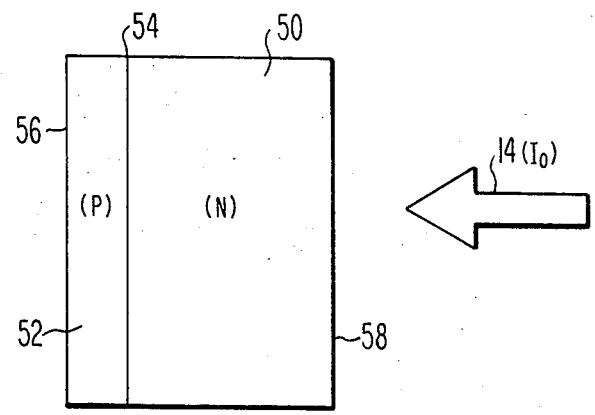

FIG. 4 illustrates a body 50, for example, formed of N-type, float-zone material, having a P-type epitaxial layer 52. The front surface 56 cannot be used to determine L in the body 50 because of the junction at the interface 54. For such a body, the SPV measurements are done on the rear face 58 with light 14.

FIGS. 3 and 4 illustrate but two bodies that are used in the practice of the invention. Other forms of wafers would include an N- body 40 (FIG. 3) with an N-type layer 42. FIG. 4 may be modified to provide an N− body 50 and a P+ layer 54. Still further bodies (not shown) may include a P− body with a P or P+ layer. A still further variation may be a P− body with an N or N+ layer. Still further forms of semiconductor bodies useful in the practice of this invention will be readily apparent to those skilled in this art.

As indicated above in the processing of semiconductor wafers for forming a layer, such as growing an epitaxial layer thereon, it is difficult to determine the minority-carrier diffusion length in such a layer. According to the present invention, we do not determine the diffusion length in the layer, but rather determine the diffusion length of the underlying substrate as will be understood from the following. The invention is based on the assumption that a contaminating specie is distributed substantially uniformly throughout the thickness (t) of the epitaxial layer 42 and the substrate 40. In a preferred form of the invention, the semiconductor body or substrate is formed of float-zone (FZ) semiconductor silicon material. The minority-carrier diffusion length of an uncontaminated float-zone silicon wafer is typically significantly high, for example, on the order of 300–400 μm. The assumption that the contaminating species are distributed substantially uniformly throughout not only the epitaxial layer 42 but also the float-zone substrate 40 is good for the following reasons. First, float-zone silicon (Si) substrates have no inherent gettering mechanisms built into them as do Czochralski type silicon (Cz-Si) substrates; and, second, at the temperature (1100°–1200° C.) normally used for epitaxial deposition, heavy metal impurities have sufficiently high diffusion coefficients (D) that the atoms of the metals can readily distribute themselves throughout the thickness (W) of an entire float-zone substrate. Presuming the validity of the assumption, the diffusion length value obtained using the principles of the present invention is a fairly accurate measure of the contamination level introduced into the epitaxial layer (42, FIG. 3; 52, FIG. 4) during the epitaxial growth process.

The heavy metals that are usually encountered in semiconductor processing that may contaminate the wafer include iron (Fe), nickel (Ni), chromium (Cr), manganese (Mn), cobalt (Co), gold (Au), silver (Ag), copper (Cu), platinum (Pt), and palladium (Pd). While bulk contamination occurs during the high temperature steps of epitaxial deposition or subsequent processing, surface contamination may occur at low temperatures during wafer handling or from the environment of an ion implantation apparatus.

It should be understood that the mere presence of a heavy metal on the surface of a device wafer does not contaminate the bulk of the wafer. However, the exposure of a wafer to a high temperature environment will cause the metal on the surface to diffuse into the wafer and thereby contaminate the bulk region of the wafer.

Accordingly, it is quite important that each wafer be cleaned properly prior to any measurement of the diffusion length and prior to inserting the wafer back into the process sequence. For example, in treating the surface of N-type material with an oxidizing agent containing manganese in preparation for SPV measurements, it is important that the surface be cleaned to remove any remnants of manganese before subjecting the wafer again to a high temperature. Solutions and steps for cleaning the surface are described in the co-pending application Ser. No. 547,012, filed by A. M. Goodman on Oct. 31, 1983, now U.S. Pat. No. 4,507,334, incorporated herein by reference.

Diffusion length measurements using the SPV method were performed on many substrates having epitaxial layers. The validity of the assumption concerning the uniformity of the impurity distribution was proven by the determination of equal diffusion-length values based on measurements made on both the front (46) and back (48) surfaces of a wafer shown in FIG. 3. The diffusion length values varied from as low as 2 μm up to 150 μm, depending upon the type of reactor or furnace in which each epitaxial layer (42) was grown. The lowest values were measured on wafers whose epitaxial layers had been deposited on float-zone substrates that had been inadvertently exposed to heavy metal contamination and were not subsequently properly cleaned. The diffusion-length determination data has allowed us to establish which particular reactors were producing epitaxial layers with the largest amount of heavy metal contamination in the layers.

In one embodiment, the invention is practiced by first making a determination of the diffusion length on a wafer prior to the growth of an epitaxial layer thereon as shown in FIG. 1. Subsequent to the deposition of the epitaxial layer as shown in FIG. 3, another determination is made of the diffusion length by illuminating the surface of either the epitaxial layer 46 or the opposite surface 48 of the wafer, as wwill be further explained. If there is a significant difference betweeh the first determination of the diffusion length and the second one, following the epitaxial layer deposition step, the difference between the two is an indication of the presence of heavy metal contamination. Although the invention does not provide for a direct measurement or determination of what particular metal effected the change in the diffusion length, the invention provides for a very rapid way to evaluate the electrical effect of the contamination that may have occurred during any step in a wafer processing operation.

In a second embodiment, in practice the step of determining the minority-carrier diffusion length prior to the formation of a layer of material on the body is eliminated by using values of diffusion length previously determined from samples of wafers formed of similar type material. Since the contamination by heavy metals is revealed by a significant decrease in the minority-carrier diffusion length due to the presence of such metals, the difference in values of the diffusion length determined from the monitor or specimen wafer directly as compared with a value previously determined from similar material is critically important.

The minority-carrier diffusion length is related to the minority-carrier lifetime by the following relationship:

$$L = \sqrt{D\tau} \quad (3)$$

where L is the minority-carrier diffusion length in cm., D is the diffusion constant in cm.$^2$/sec. and $\tau$ is the minority-carrier lifetime in seconds.

In the practice of the invention, one may determine the diffusion length before (actually or by a priori data) and after each process step and make a calculation of the comparison by, for example, a ratio (R) of the first value to the second. Accordingly, such a relationship may be shown as follows:

$$L_0/L_n = k(\tau_0/\tau_n)^{\frac{1}{2}} = R \quad (4)$$

A solution of equation (4) will show that the ratio $(\tau_0/\tau_n)$ of the lifetimes of respective diffusion-length determinations is an indication of the increase in the number of defect sites in the material caused by the contamination with one or more of the heavy metals. Thus, for example, a ratio (R) of 20 of the diffusion lengths, determined before and after a process step, will indicate an increase by a factor of 400 in the effective recombination center density in the wafer.

In the practice of the invention, we have discovered that the presence of a junction of sufficient barrier height ($\Phi_B$) at the interface 44 of the epitaxial layer of the substrate, can lead to erroneous diffusion length values, as mentioned above. In order to avoid such erroneous values, we provide, according to one feature of the invention, the step of removing, by etching, the epitaxial layer 42 following the deposition of the epitaxial layer and before making the second diffusion length measurement. In this way, the deleterious effect of the presence of the high potential barrier junction is obviated.

In the alternative, even with the presence of the high potential barrier junction, illuminating the reverse or opposite surface of the wafer for the determination of the minority-carrier diffusion length can be used. This approach is valid since the assumption, as described above, is that the contamination of the epitaxial layer is introduced into the substrate on a substantially uniform basis. Accordingly, a measurement of the SPV from the opposite surface of the substrate will provide a diffusion length that is representative of a measurement that would have been made on the opposite face, absent a high potential barrier Junction.

In many experiments where the conductivity type of both the substrate and the layer were the same, we have measured equal values of the diffusion length to within 10% on both the front and back surfaces of the wafers.

Where the epitaxial layer is formed of opposite conductivity type, as that of the float-zone material substrate, either the diffusion length has only been measured on the reverse or back surface of the wafer, or, if front surface measurements were desired, the epitaxial layer was removed by etching in a suitable etchant, such as an $HF/HNO_3/CH_3COOH$ mixture.

On making measurements on the surface of N-type silicon material, it is preferred that the surface be treated with a strong oxidizing agent taken from the group consisting of potassium permanganate, potassium dichromate and ammonium dichromate. Following the application of the oxidizing agent, the surface is rinsed with distilled water to remove residue of the oxidizing agent from the surface. Subsequently, the surface is dried in a clean environment in preparation for the measurement of the minority-carrier diffusion length by the SPV method. Details of the method of treating the surface are described in the co-pending application of A. M. Goodman, Ser. No. 547,012, filed on Oct. 31, 1983, incorporated herein by reference. Details for treating the surface of P-type material are described in A. M. Goodman's application Ser. No. 547,326, filed Oct. 31, 1983, now U.S. Pat. No. 4,567,431, incorporated herein by reference.

We describe here one example of a contaminating source during the formation of a surface layer that is commonly used for emitters in PNP-type structures and the bases in NPN-type structures. This example is borosilicate glass (BSG) that is deposited on the semiconductor surface, such as silicon, by chemical vapor deposition (CVD) at atmospheric pressure and at a temperature of 350°–400° C. Subsequent to the deposition of the BSG on the surface of the wafers, boron diffusion into the wafers is carried out in a high-temperature furnace. We discovered that in such doping processes, problems occur in which the minority-carrier lifetime was reduced due to contamination by heavy metals or by some means other than the BSG. We discovered that the wafers that were coated with BSG and subsequently diffused had slightly lower diffusion-length values than those wafers that were not coated with the BSG but exposed to the same high temperature diffusion step. Accordingly, it was clear that contaminated BSG was most likely the cause of poor minority-carrier lifetime.

The atmospheric systems used to deposit BSG need not be sources of significant heavy metal contamination. For example, large diffusion-length values in the range of 60–100 $\mu$m have been determined for wafers coated with BSG in clean atmospheric reactors and subsequently diffused. Such larger values of minority-carrier diffusion length are sufficient for most silicon devices manufactured presently. Accordingly, to eliminate inaccuracies in the SPV determination of diffusion length produced by the boron-doped surface region, SPV data measurements are performed on the reverse surface from the boron-doped layer. Again, this method relies on the principle of the invention that the diffusion of the contamination is uniform throughout the layer as well as the substrate. In the alternative, the boron-doped layer is removed by etching so that the surface exposed thereby can be illuminated for the SPV measurements.

Subsequent high temperature processing of a wafer may further contaminate it following, for example, a step of applying a passivant, such as a glass coating, to encapsulate the wafer and hermetically seal it. For example, a particular form of passivating material is a borophososilicate glass (BPSG). Other forms of passivants are well-known in the art, any one of which, while being applied, may cause heavy metal contamination to the wafer. It is difficult to make a measurement of the presence of contamination that may have been effected by this step. Accordingly, the invention provides for the use of a monitor wafer that is positioned within the same chamber in which the passivating deposition occurs. Any contamination by heavy metals will also contaminate the monitor wafer. Accordingly, the monitor wafer is tested by the SPV method described hereinabove to determine the presence or absence of a contaminating metal by removing the passivant before making the SPV measurements. This procedure thereby provides for a sure method of determining whether a wafer has been contaminated during the passivating step.

What is claimed is:

1. A method for revealing the presence of heavy metal impurities introduced during a processing step on a body of semiconductor material having a surface layer with a thickness t, said body having two major surfaces comprising the steps:
    (a) determining by the constant-magnitude steady-state surface photovoltage (SPV) method a first minority-carrier diffusion length ($L_0$) of said body formed of semiconductor material by illuminating either of said major surfaces at a step prior to forming said layer, where length ($L_0$) is at least as great as thickness t;
    (b) forming said layer on one of said major surfaces of said body;
    (c) heating said body and layer to a temperature sufficient to diffuse heavy metals present from said surface layer into said body; and
    (d) determining by said SPV method a second minority-carrier diffusion length ($L_1$) of said body by illuminating said major surface opposite from said surface layer, whereby a large ratio of length $L_0$ to length $L_1$ is indicative of the presence of a heavy metal impurity in said layer.

2. The method of claim 1 further comprising the step of forming said body of float-zone (FZ) semiconductor material.

3. The method of claim 1 wherein said layer forming and heating step comprise forming said layer by epitaxial deposition on one of said major surfaces of said body.

4. The method of claim 1 wherein said layer forming step comprises diffusing dopant atoms into said body to define thereby said surface layer.

5. The method of claim 1 wherein additional processing steps to said layer are performed including heating said body to a temperature sufficient to diffuse any heavy metals that may have appeared on said surface layer; and then determining the minority-carrier diffusion length ($L_1$) of said body to reveal the presence of a heavy metal impurity according to step (d).

6. The method of claim 1 wherein said layer is further processed by doping it with material containing dopant atoms; heating said body to a temperature sufficient to diffuse heavy metals that may be present on said surface layer into said layer; and determining the minority-carrier diffusion length ($L_1$) of said body to reveal the presence of a heavy metal impurity according to step (d).

7. The method of claim 1 wherein said layer is further processed by depositing a layer of passivating material on said body; subsequently heating said body to a temperature sufficient to diffuse heavy metals into said layer and said body that may be present on said surface layer; thereafter removing said layer of passivant and determining the carrier diffusion length of said body according to step (d) to reveal the presence of a heavy metal impurity.

8. The method of claim 1 wherein the ratio of $L_0$ to $L_1$ is 20 or greater.

9. The method of claim 1 wherein said layer is formed of material whereby a junction region is formed between said layer and said body, wherein the potential barrier ($\Phi_B$) across said junction is greater than 2kT wherein k is Boltzman's constant and T is the temperature in degrees Kelvin, further comprising the steps of:

removing said layer, and thereafter measuring said length ($L_1$) by illuminating said major surface exposed by the removal of said layer, whereby a small value of the diffusion length $L_1$ compared to the diffusion length $L_0$, is indicative that heavy metal contaminants were present in said layer.

10. A method for revealing the presence of heavy metal impurities introduced during a processing step on a body of semiconductor material having a surface layer with a thickness t, said body having two major surfaces comprising the steps:

(a) selecting said body formed of semiconductor material having a known minority-carrier diffusion length ($L_0$), where length ($L_0$) is at least as great as thickness t;

(b) forming a layer on one of said major surfaces of said body; and (c) heating said body and layer to a temperature sufficient to diffuse heavy metals into said body from said surface layer; and (d) determined by the constant-magnitude steady-state surface photovoltage (SPV) method the actual minority-carrier diffusion length ($L_1$) of said body by illuminating said major surface opposite from said surface layer, whereby a large ratio of the known length $L_0$ to the actual length $L_1$ is indicative of the presence of a heavy metal impurity in said layer.

11. The method of claim 10 further comprising the step of forming said body of float-zone (FZ) semiconductor material.

12. The method of claim 10 wherein said layer forming and heating step comprise forming said layer by epitaxial deposition on one of said major surfaces of said body.

13. The method of claim 10 wherein said layer forming step comprises diffusing dopant atoms into said body to define thereby said surface layer.

14. The method of claim 10 wherein additional processing steps to said layer are performed including heating said body to a temperature sufficient to diffuse any heavy metals that may have appeared on said surface layer; and then determining the minority-carrier diffusion length ($L_1$) of said body to reveal the presence of a heavy metal impurity according to step (d).

15. The method of claim 10 wherein said layer is further processed by doping it with material containing dopant atoms; heating said body to a temperature sufficient to diffuse heavy metals into said layer and said body; and determining the minority-carrier diffusion length ($L_1$) of said body to determine the presence of a heavy metal impurity according to step (d).

16. The method of claim 10 wherein said layer is further processed by depositing a layer of passivating material on said body; subsequently heating said body to a temperature sufficient to diffuse heavy metals that may be present on said surface layer into said layer; and thereafter removing said layer of passivant and determining the carrier diffusion length of said body according to step (d) to reveal the presence of a heavy metal impurity.

17. The method of claim 10 wherein the ratio of $L_0$ to $L_1$ is 20 or greater.

18. The method of claim 10 wherein said layer is formed of material whereby a junction region is formed between said layer and said body, wherein the potential barrier ($\Phi_B$) across said junction is greater than 2kT wherein k is Boltzman's constant and T is the temperature in degrees Kelvin, further comprising the steps of:

removing said layer, and thereafter measuring said length ($L_1$) by illuminating said major surface exposed by the removal of said layer, whereby a small value of the diffusion length $L_1$ compared to the diffusion length $L_0$, is indicative that heavy metal contaminants were present in said layer.

* * * * *

UNITED STATES PATENT AND TRADEMARK OFFICE
CERTIFICATE OF CORRECTION

PATENT NO. : 4,598,249

DATED : July 1, 1986

INVENTOR(S) : Lawrence A. Goodman et al.

It is certified that error appears in the above-identified patent and that said Letters Patent is hereby corrected as shown below:

Column 3, line 35, "$\alpha W>1$" should be --$\alpha W>>1$--;
"$\alpha W<1$" should be --$\alpha w<<1$--;
"$W>L$" should be --$W>>L$--;
"$w<L$" should be --$w<<L$--.

Column 4, line 65, "the" should be after "deposition".

Column 6, line 35, "the" should be after "of".

Column 6, line 66, "Junction" should be --junction--.

Column 9, line 40, "determined" should be --determining--.

Signed and Sealed this

Twenty-third Day of September 1986

[SEAL]

Attest:

DONALD J. QUIGG

Attesting Officer

Commissioner of Patents and Trademarks